United States Patent
Cheng et al.

(10) Patent No.: US 9,030,766 B2
(45) Date of Patent: May 12, 2015

(54) DISPLACEMENT MECHANISM, LENS MODULE USING THE SAME AND DEVICE USING THE SAME

(71) Applicant: Ability Enterprise Co., Ltd., Taipei (TW)

(72) Inventors: Wen-Chieh Cheng, Taipei (TW); Mu-Yuan Wu, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 43 days.

(21) Appl. No.: 13/903,647

(22) Filed: May 28, 2013

(65) Prior Publication Data

US 2013/0335838 A1    Dec. 19, 2013

(30) Foreign Application Priority Data

Jun. 13, 2012  (TW) .............................. 101121166 A

(51) Int. Cl.
*G02B 7/02* (2006.01)
(52) U.S. Cl.
CPC ..................... *G02B 7/023* (2013.01)
(58) Field of Classification Search
CPC ........................................................ G02B 7/023
USPC .......................................... 359/822, 823, 819
See application file for complete search history.

(56) References Cited

U.S. PATENT DOCUMENTS

| | | | |
|---|---|---|---|
| 7,747,149 B2 | 6/2010 | Tomita | |
| 7,881,597 B2 | 2/2011 | Tsutsumi et al. | |
| 7,995,099 B2 | 8/2011 | Maeda | |
| 8,098,982 B2 | 1/2012 | Nakayama | |
| 8,184,966 B2 | 5/2012 | Tsutsumi et al. | |
| 2006/0115256 A1* | 6/2006 | Nomura | 396/55 |
| 2006/0285839 A1 | 12/2006 | Tomita | |
| 2008/0170127 A1 | 7/2008 | Maeda | |
| 2011/0194199 A1 | 8/2011 | Lim et al. | |

FOREIGN PATENT DOCUMENTS

| | | |
|---|---|---|
| CN | 1892295 A | 1/2007 |
| CN | 101441385 A | 5/2009 |
| CN | 101825776 A | 9/2010 |
| EP | 2226665 A1 | 9/2010 |
| TW | 200839420 A | 10/2008 |

OTHER PUBLICATIONS

Chinese Office Action dated Feb. 17, 2015.

* cited by examiner

*Primary Examiner* — William Choi
(74) *Attorney, Agent, or Firm* — Rabin & Berdo, P.C.

(57) ABSTRACT

A displacement mechanism, a lens module using the same and a device using the same are provided. The displacement mechanism of lens module comprises a base, a first element and a second element. The first element is disposed on the base, wherein the first element is immovably disposed relative to the base along a first direction and movably disposed relative to the base the base along a second direction. The second element is disposed on the base, wherein the second element is movably disposed relative to the first element along the first direction and movably disposed relative to the base along the first direction and the second direction.

20 Claims, 3 Drawing Sheets

DISPLACEMENT MECHANISM, LENS MODULE USING THE SAME AND DEVICE USING THE SAME

This application claims the benefit of Taiwan application Serial No. 101121166, filed Jun. 13, 2012, the subject matter of which is incorporated herein by reference.

BACKGROUND OF THE INVENTION

1. Field of the Invention

The invention relates in general to a displacement mechanism, a lens module using the same and a device using the same, and more particularly to a displacement mechanism applied in an image device, a lens module using the same and a device using the same.

2. Description of the Related Art

Convention digit image capturing module is widely used, such as digital camera, digital video recorder, video lens for family or conference, etc. In convention digit image capturing module, an image sensing device is disposed on a printed circuit board, and a lens module is combined thereto. When convention digit image capturing module is operated, the image sensing device transfers an optical image signal sensed by the mage sensing device to an electrical signal by photoelectric sensing technology; accordingly, the optical image signal can be stored, recognized and processed.

To promote quality of image, conventional digit image capturing module comprises a displacement mechanism. However, the displacement mechanism comprising a large number of components results in difficulty in fabricating.

SUMMARY OF THE INVENTION

The invention is directed to a displacement mechanism, a lens module using the same, and the displacement mechanism is easy to be assembled.

According to an embodiment of the present invention, a displacement mechanism is provided. The displacement mechanism comprises a base, a first element and a second element. The first element is disposed on the base, wherein the first element is immovably disposed along a first direction relative to the base and movably disposed along a second direction relative to the base. The second element is connected to the first element, wherein the second element is movably connected along the first direction relative to the first element. The second element is disposed on the base, wherein the second element is movably disposed along the first direction and the second direction relative to the base.

According to another embodiment of the present invention, a lens module is provided. The lens module comprises a displacement mechanism. The displacement mechanism comprises a base, a first element and a second element. The base has a first groove and a first portion. The first element is disposed on the base, wherein the first element is immovably disposed along a first direction relative to the base and movably disposed along a second direction relative to the base. The first element comprises a first rod and a second rod. The second element is connected to the first element, wherein the second element is movably connected along the first direction relative to the first element. The second element is disposed on the base, wherein the second element is movably disposed along the first direction and the second direction relative to the base. The second element has a hole, wherein the first rod of the first element is penetrated into the hole of the second element and the first groove of the base, and the second rod of the first element is movably disposed on the sliding potion of the base along the second direction.

According to another embodiment of the present invention, a displacement mechanism is provided. The displacement mechanism comprises a base, a first element and a second element. The second element is disposed on the base. The first element connects the base and the second element. The second element moves along the first direction relative to the first element. The first element moves along the first direction relative to the second element. The second element moves along the first direction relative to the second element. The first element moves along the second direction relative to the base.

According to another embodiment of the present invention, a displacement mechanism is provided. The displacement mechanism comprises a base, a first element and a second element. The second element is disposed on the base, wherein the second element moves along at least one of a first direction and a second direction relative to the base. The first element is connected to the base and the second element, wherein the first element moves relative to the base along the first direction and along the second direction.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
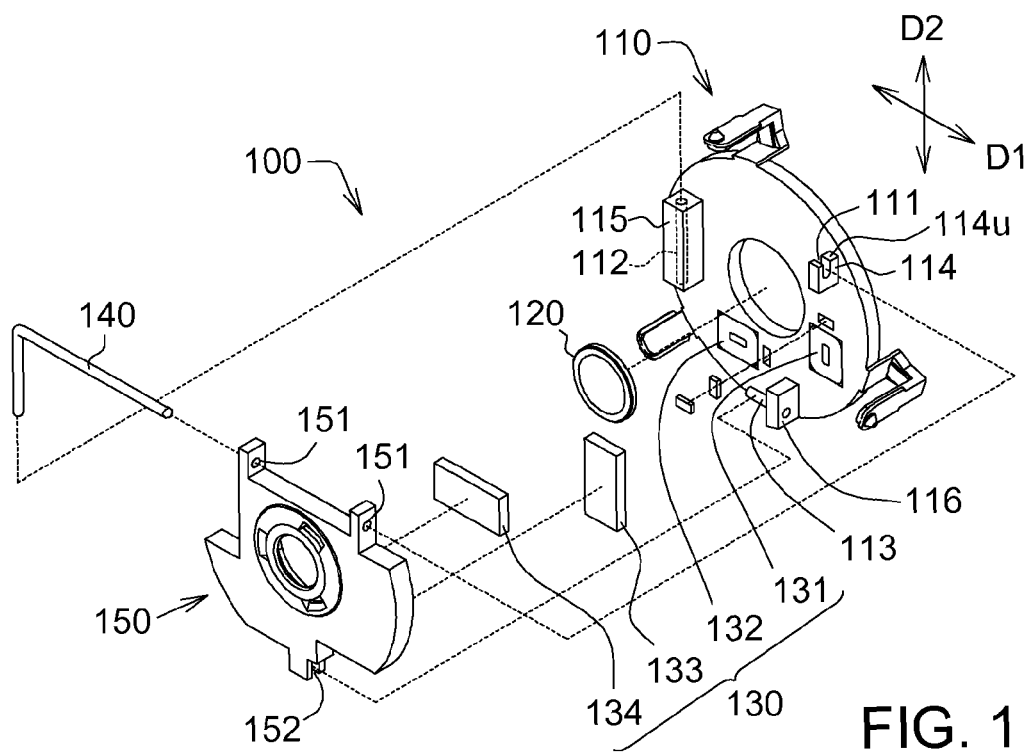
FIG. 1 illustrates a decomposition diagram of a displacement mechanism according to an embodiment of the invention.

Referring to FIG. 1, a decomposition diagram of a displacement mechanism according to an embodiment of the invention is illustrated. The displacement mechanism 100 may be used in various devices with image capturing function, and may be realized by such as digital camera, digital video recorder, mobile phone or personal digital assistant (PDA). The displacement mechanism 100 can compensate an image-formed surface of an optical system or an offset of the focus for promoting quality of image.

The displacement mechanism 100 comprises a base 110, a lens 120, a voice coil motor (VCM) 130 and a first element 140 and a second element 150.

The base 110 comprises a first groove 111 and a portion 112, and the first element 140 comprises a third rod, such as a rail 113 disposed on the base 110. In present embodiment, the portion 112 is a groove, wherein the portion 112 and the first groove 111 are extended along a second direction D2, and the rail 113 of the first element 140 is extended along a first direction D1.

The base 110 further comprises a first protrusion 114, a second protrusion 115 and a third protrusion 116, wherein the first groove 111 is formed on the first protrusion 114 and extended to an upper surface 114u of the first protrusion 114 along the second direction D2. In present embodiment, the portion 112 may or may not perforate the second protrusion 115. In addition, the rail 113 is fixedly disposed on the third protrusion 116 of the base 110 after being separately manufactured; however, in another embodiment, the rail 113 and the base 110 are integrated into one piece.

The lens 120 is realized by a displacement lens or a displacement lens group comprising at least one displacement lens. The lens 120 is disposed on the second element 150 to be driven by the second element 150 to compensate the offset of the lens 120. The lens 120 can by realized by a convex lens, a concave lens, an aspheric surface lens, a free-form curved surface lens, a balsaming lens and/or combination thereof.

The VCM 130 comprises a first coil 131, a second coil 132, a first magnet 133 and a second magnet 134, wherein the first coil 131 and the second coil 132 are disposed on the base 110, and the first magnet 133 and the second magnet 134 are disposed on the second element 150. After electric current is transmitted through the first coil 131, the second element 150 is moved along the first direction D1 relative to the base 110 by the first coil 131 and the first magnet 133. Similarly, after electric current is transmitted through the second coil 132, the second magnet 134 generates a magnetic force to drive the second element 150 to move along the second direction D2 relative to the base 110. For example, the base 110 may be fixedly disposed on an optical system, that is, the base 110 is fixed relative to the an optical axis of the optical system, and the VCM 130 drives the second element 150 to move along the first direction D1 and/or the second direction D2. In present embodiment, the first direction D1, for example, X-axis, and the second direction D2 is, for example, Y-axis, wherein the X-axis is perpendicular to the Y-axis. In another embodiment, the first direction D1 is not perpendicular to the second direction D2, and an included angle between the first direction D1 and the second direction D2 is different from 90 degrees.

In one-time control, the VCM 130 can control the second element 150 to move along one of the first direction D1 and the second direction D2, or controls the second element 150 moves along the first direction D1 and the second direction D2 simultaneously; however, such exemplification is not meant to be limiting, and the control method depends on practical requirement.

Figure 2:
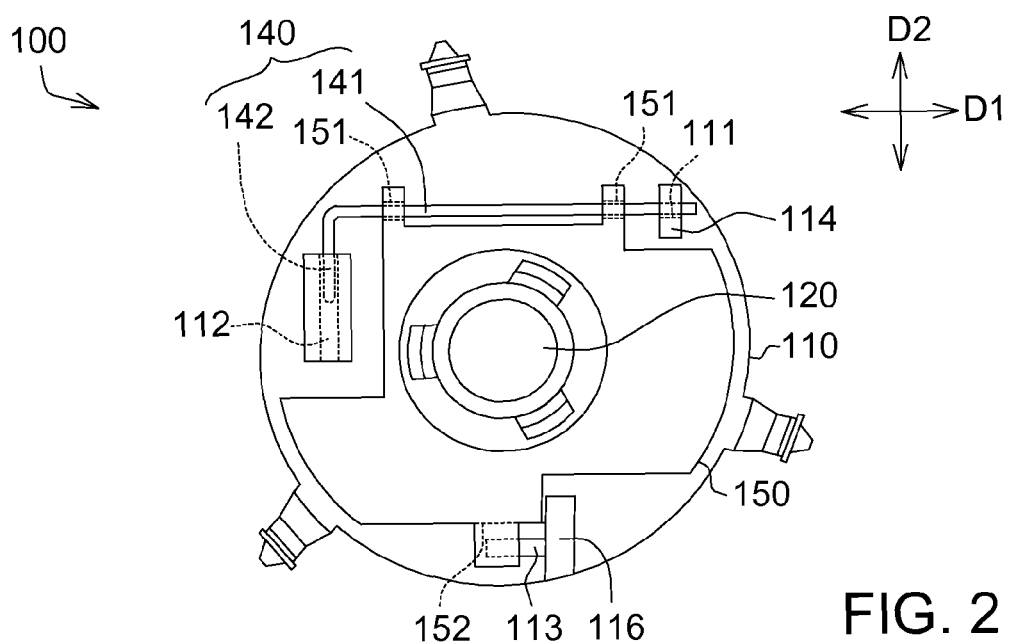
FIG. 2 illustrates an assembly diagram of FIG. 1.

Referring to FIG. 2, an assembly diagram of FIG. 1 is illustrated. The first element 140 makes a relatively movement between the base 110 and the second element 150 by the first groove 111 of the base 110, the portion 112 of the base 110 and the hole 151 of the second element 150. The first element 140 comprises a first rod 141 and a second rod 142, wherein a first end of the second rod 142 is fixed to the first rod 141, and a second end of the second rod 142 is movably penetrated into the portion 112 (such as groove) of the base 110. The first rod 141 and the second rod 142 are isodiametric rod. The first rod 141 and the second rod 142 can be formed by way of bending a rod using bending technology, such that the first rod 141 and the second rod 142 are integrated into one piece.

The first rod 141 of the first element 140 is movably disposed on the first groove 111 of the base 110. Since a length along the second direction D2 of the first groove 111 is larger than an outer diameter of the first rod 141, the first rod 141 movably disposed in the first groove 111; accordingly, the first element 140 and the second element 150 can move in a straight line along the second direction D2 when the second element 150 is controlled to move along the second direction D2.

The first element 140 is disposed on the base 110, wherein the first element 140 is immovably disposed along the first direction D1 relative to the base 110 and movably disposed along the second direction D2 relative to the base 110. For example, since the second rod 142 of the first element 140 is movably disposed within the portion 112 extended along the second direction D2, the first element 140 disposed within the portion 112 is immovably disposed on the base 110 along the first direction D1 and movably disposed on the base 110 along the second direction D2. In addition, since the first rod 141 of the first element 140 is movably penetrated into the hole 151 of the second element 150, when the second element 150 is controlled to move along the second direction D2, the second element 150 is avoided to move along the first direction D1 because being guided by the first element 140; accordingly, the variability in control can be reduced.

In addition, a clearance between the portion 112 and the second rod 142 ranges between about 5 and 8 micrometer, and such clearance can ensure superior control for the second element 150. In another embodiment, the clearance between the portion 112 and the second rod 142 can larger than 8 micrometer, or less than 5 micrometer.

The second element 150 is movably connected to the first element 140 along the first direction D1. For example, since an inner diameter of the second element 150 is larger than or substantially equal to an outer diameter of the first rod 141 of the first element 140, the second element 150 is movably connected to the first element 150 along the first direction D1; accordingly, the second element 150 is movable relative to the first element 140.

The second element 150 is movably disposed on the base 110 along the first direction D1 and the second direction D2. For example, the second element 150 has a groove 152 extended along the first direction D1 and the second direction D2, and movably connected to the rail 113 of the first element 140, such that the second element 150 moves in a straight line along the first direction D1 and the second direction D2; as a result, the second element 150 can be controlled to move along the first direction D1 and the second direction D2.

Through connection relationship between above the base 110, the first element 140 and the second element 150, and under a relative position between the base 110 and the optical axis being fixed, the first element 140 is disposed on the base 110, wherein the first element 140 is immovably disposed along the first direction D1 relative to the base 110 and movably disposed along the second direction D2 relative to the base 110, the second element 150 is connected to the first element 140, wherein the second element 150 is movably connected along the first direction D1 relative to the first element 140, and the second element 150 is disposed on the base 110, wherein the second element 150 is movably disposed along the first direction D1 and the second direction D2 relative to the base 110; as a result, while the VCM 130 controls the second element 150 to move along the first direction D1, the second element 150 is avoided to move out of control along the second direction D2, and while the VCM 130 controls the second element 150 to move along the second direction D2, the second element 150 is avoided to move out of control along the first direction D1. That is, the VCM 130 controls the second element 150 to move along one of the first direction D1 and the second direction D2, the second element 150 is avoided to move out of control along another of the first direction D1 and the second direction D2.

Figure 3:
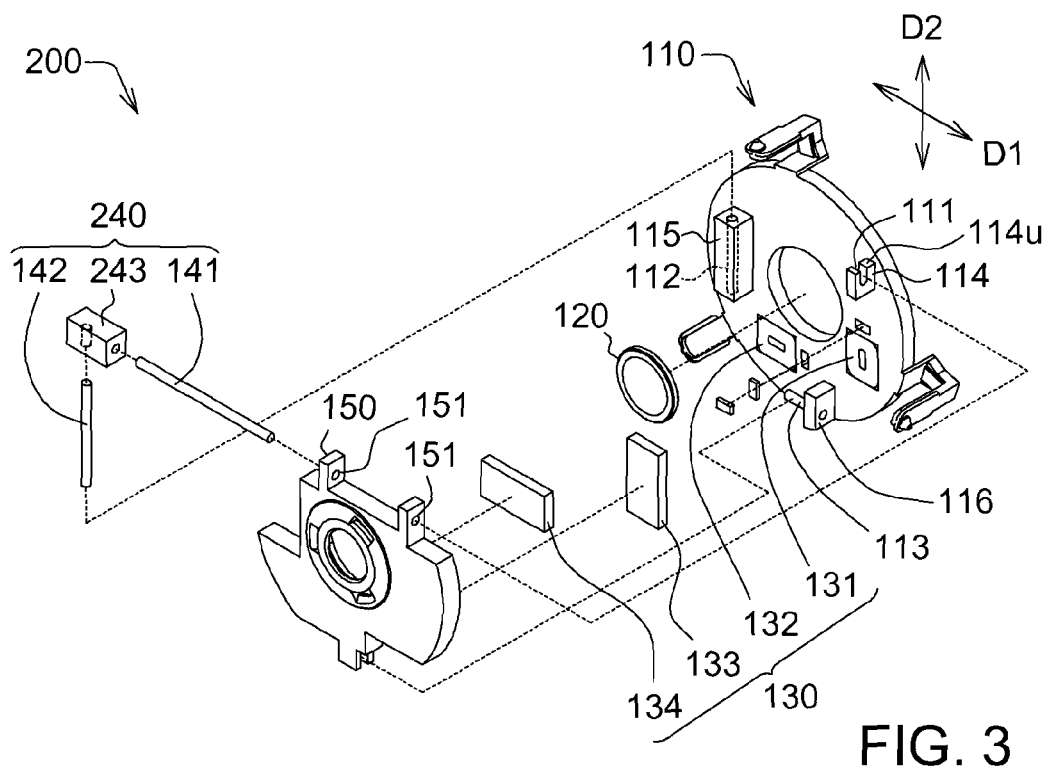
FIG. 3 illustrates a decomposition diagram of a displacement mechanism according to another embodiment of the invention.

Referring to FIG. 3, a decomposition diagram of a displacement mechanism according to another embodiment of the invention is illustrated. The displacement mechanism 200 comprises the base 110, the lens 120, the VCM 130 and the first element 240 and the second element 150.

The first element 240 comprises the first rod 141, the second rod 142 and a connection block 243. The first rod 141 and the second rod 142 are fixedly connected by the connection block 243 by way of interference fit or adhesion technique.

Figure 4:
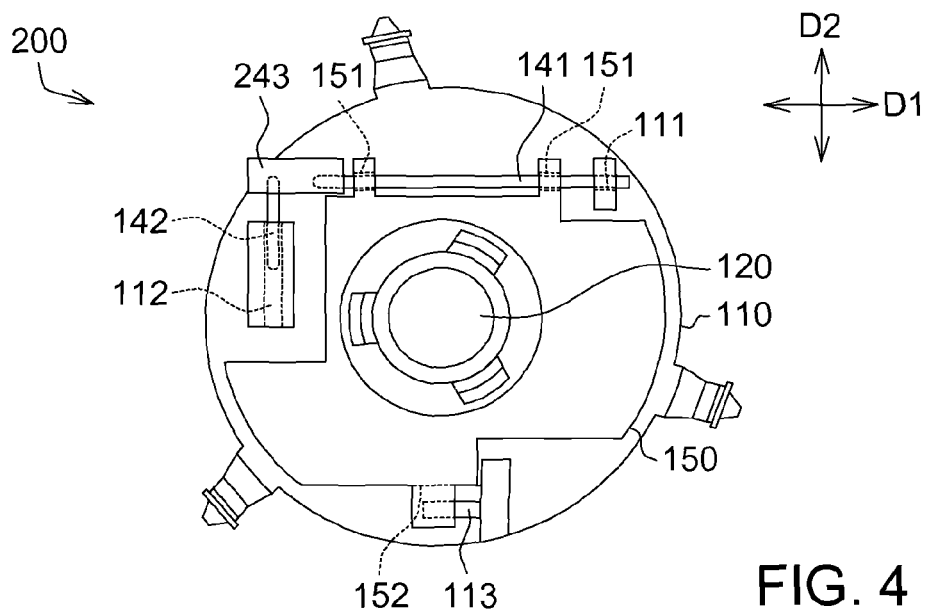
FIG. 4 illustrates an assembly diagram of the displacement mechanism of FIG. 3.

Referring to FIG. 4, an assembly diagram of the displacement mechanism of FIG. 3 is illustrated. The first element 240 is disposed on the base 110, wherein the first element 240 is immovably disposed along the first direction D1 relative to the base 110 and movably disposed along the second direction D2 relative to the base 110. For example, since the second rod 142 of the first element 240 is movably disposed within the portion 112 extended along the second direction D2, such that the first element 240 disposed within the portion 112 is immovably disposed on the base 110 along the first direction D1 and movably disposed on the base 110 along the second direction D2. In addition, the first rod 141 of the first element 240 is movably penetrated into the hole 151 of the second element 150. While the second element 150 is controlled to move along the second direction D2, the second element 150 is avoided to move along the first direction D1 because being guided by the first element 240; accordingly, the variability in control can be reduced.

Figure 5:
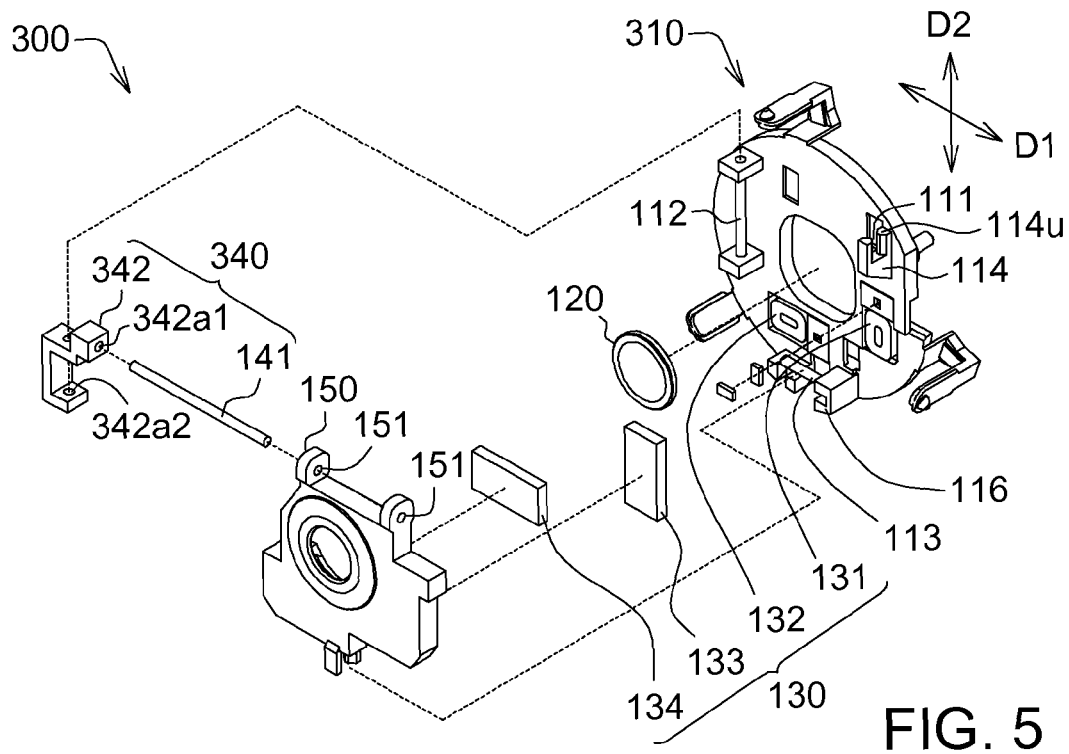
FIG. 5 illustrates a decomposition diagram of a displacement mechanism according to another embodiment of the invention.

Referring to FIG. 5, a decomposition diagram of a displacement mechanism according to another embodiment of the invention is illustrated. The displacement mechanism 300 comprises the base 110, at least one lens 120, the VCM 130 and the first element 340 and the second element 150.

In present embodiment, the portion 112 of the base 110 is a rail. The first element 340 comprises the first rod 141 and a second rod 342, wherein the second 342 has a fastening hole 342a1 within which an end of the first rod 141 is fixedly connected. In addition, the first rod 141 and the second rod 342, after being manufactured respectively, are combined as the first element 340 by way of interference fit or adhesion technique. In another embodiment, the first rod 141 and the second rod 342, being manufactured in the same manufacturing process or two different manufacturing processes, are integrated into one piece. The motioned above manufacturing process is injection molding or machining technique, for example.

Figure 6:
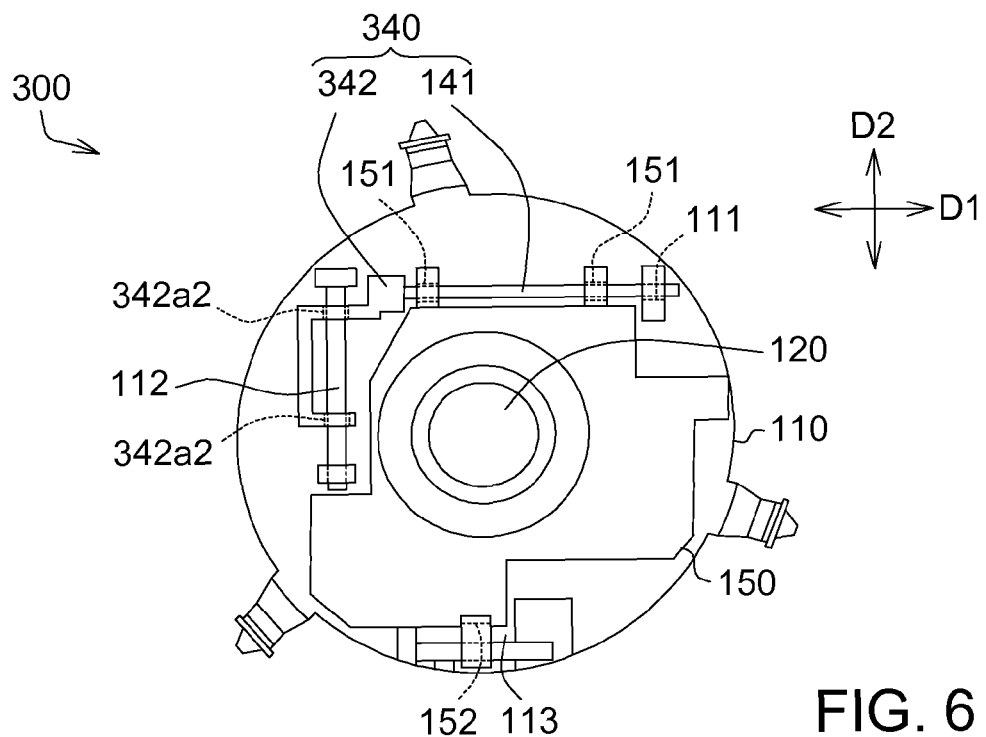
FIG. 6 shows an assembly diagram of the displacement mechanism of FIG. 5.

Referring to FIG. 6, an assembly diagram of the displacement mechanism of FIG. 5 is illustrated. The second rod 342 of the first element 340 has a groove 342a, and the portion 112 of the base 110 is movably connected to the groove 342a of the second rod 342. The first element 340 is disposed on the base 110, wherein the first element 340 is immovably disposed along the first direction D1 relative to the base 110 and movably disposed along the second direction D2 relative to the base 110. For example, since the second rod 342 of the first element 340 is movably connected to portion 112 extended the second direction D2, the first element 340 connected to the portion 112 is disposed on the base 110, wherein the first element 340 is immovably disposed along the first direction D1 relative to the base 110 and movably disposed along the second direction D2 relative to the base 110. In addition, the first rod 141 of the first element 340 is movably penetrated into the hole 151 of the second element 150. While the second element 150 is controlled to move along the second direction D2, the second element 150 is avoided to move along first direction D1 because being guided by the first element 340; accordingly, the variability in control can be reduced.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A displacement mechanism of a lens module, the displacement mechanism comprising:
   a base;
   a first element disposed on the base, the first element being immovable along a first direction and movable along a second direction relative to the base; and
   a second element disposed on the base, the second element being movable along the first direction relative to the first element and movable along the first direction and the second direction relative to the base;
   wherein while the first element moves relative to the base, the second element leads the first element movement along the second direction.

2. The displacement mechanism according to claim 1, wherein the base has a first groove and a portion, the second element has a hole, and the first element makes a relative movement between the base and the second element by the first groove, the portion and the hole.

3. The displacement mechanism according to claim 2, wherein the first element comprises a first rod and a second rod, the first rod movably penetrates the hole of the second element and the first groove of the base, and the second rod is movably disposed on the portion for movement along the second direction.

4. The displacement mechanism according to claim 3, wherein the first rod and the second rod are integrated into one piece, or the first rod is fixedly connected to the second rod by a connection block.

5. The displacement mechanism according to claim 3, wherein the portion of the base comprises a groove, a first end of the second rod is fixed to the first rod, and a second end of the second rod is movably penetrates the groove of the base.

6. The displacement mechanism according to claim 1, wherein the base comprises:
   a rail extended along the first direction, wherein the first element is movably disposed on the rail.

7. The displacement mechanism according to claim 1, wherein the second element has a groove extended along the first direction and the second direction, and the first element is fixed on the base and movably disposed within groove of the second element.

8. The displacement mechanism according to claim 1, wherein the first direction is perpendicular to the second direction.

9. A device, comprising a lens module according to claim 1.

10. A lens module having a displacement mechanism, and the displacement mechanism comprising:
    a base comprising a first groove and a portion;
    a first element movably disposed on the base and comprising a first rod and a second rod; and
    a second element disposed on the base and comprising a hole, the second element being movably connected to the first element for movement along the first direction and the second direction;
    wherein the first rod is movably penetrates the hole and the first groove, and the second rod is movably penetrates the portion.

11. The lens module according to claim 10, wherein the second element further comprises a groove, the first element further comprises a third rod, and the third rod is fixed to the base and movably disposed within the groove of the second element.

12. The lens module according to claim 11, wherein the base further comprises a rail, and the third rod of the first element is disposed in the rail.

13. The lens module according to claim 10, wherein the first rod and the second rod are Integrated into one piece, or the first rod and the second rod are fixed by a connection block.

14. The lens module according to claim 10, wherein the first direction and the second direction are perpendicular.

15. A device, comprising a lens module according to claim 10.

16. A displacement mechanism comprising a lens, a base, a first element and a second element, the lens beings disposed on the second element, the first element being disposed between the base and the second element;

wherein the second element moves along a first direction relative to the base and the first element; and wherein the second element moves along a second direction relative to the base, and the first element moves along the second direction relative to the base by the second element.

17. The displacement mechanism according to claim 16, wherein the base comprises a first groove, the first element comprises a first rod, the second element comprises a hole, and the first rod is movably penetrates the hole and the first groove.

18. The displacement mechanism according to claim 16, wherein the base comprises a portion, the first element comprises a second rod, and the second rod is disposed within the portion.

19. The displacement mechanism according to claim 16, wherein the first direction and the second direction are perpendicular.

20. A device, comprising a displacement mechanism according to claim 16.

\* \* \* \* \*